Jan. 1, 1929.                A. C. JACKSON                1,697,652
                              HOOD CATCH
                           Filed Dec. 11, 1925
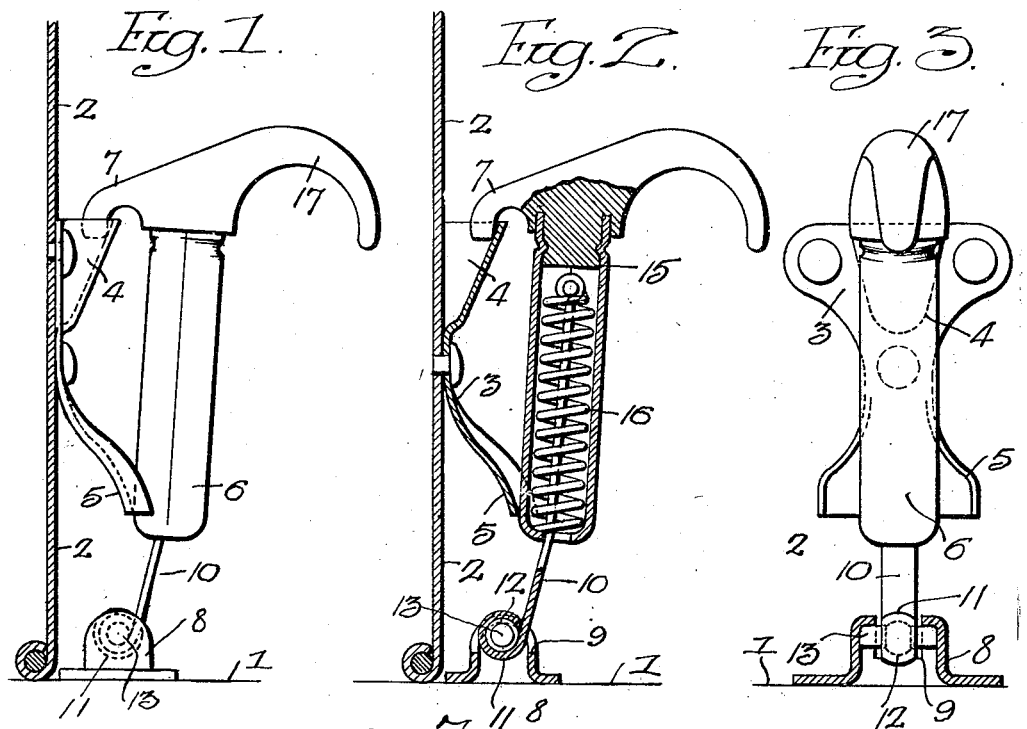
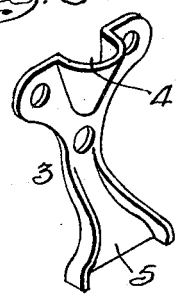
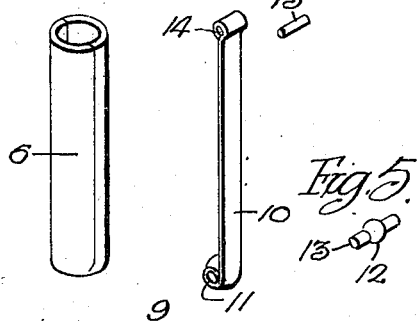
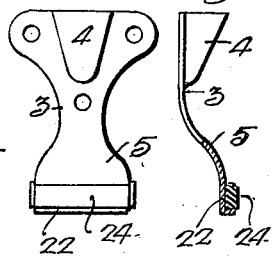
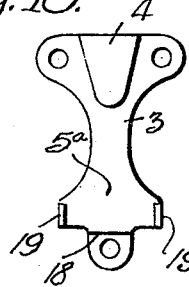
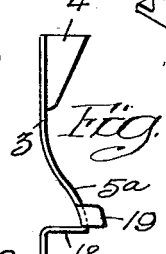
Inventor
Arthur C. Jackson
by his Attorneys
Howson & Howson Patented Jan. 1, 1929.

1,697,652

UNITED STATES PATENT OFFICE.

ARTHUR C. JACKSON, OF PHILADELPHIA, PENNSYLVANIA, ASSIGNOR TO THE YALE & TOWNE MANUFACTURING COMPANY, OF STAMFORD, CONNECTICUT, A CORPORATION OF CONNECTICUT.

HOOD CATCH.

Application filed December 11, 1925. Serial No. 74,862.

One object of my invention is to manufacture a catch for fastening the hoods of automobiles, so that it will have sufficient flexibility to allow it to be readily applied to an automobile without careful lining up of the parts, and which will accommodate itself to any irregularity due to rapid assemblage.

A further object of the invention is to provide the catch with a spring bar which will yield when the catch is attached to the keeper on the hood, so as to hold the hood and prevent it from rattling, by pressing it against the body and the radiator.

The invention relates, also, to certain details of construction which will be described hereinafter.

In the accompanying drawing:

Fig. 1 is a side view of my improved hood-catch;

Fig. 2 is a sectional elevation of the same;

Fig. 3 is a front view;

Figs. 4, 5, 6 and 7 are detached perspective views of parts of the catch;

Fig. 8 is a detached perspective view of the keeper;

Figs. 9 and 10 are views illustrating modifications of the invention; and

Figs. 11 and 12 are views of further modifications, showing an insert of rubber.

1 is the frame of an automobile and 2 is the hood. The keeper 3 is secured to the hood by rivets or bolts as shown, and has a socket portion 4, tapered as illustrated in Fig. 8, and having a broad extension 5, preferably provided with an ear at each side forming a rest for the tubular casing 6 of the catch, when the hooked portion 7 is in engagement with the socket of the keeper.

The bearing 8 of the catch is secured to the frame 1 in the present instance, and is slotted at 9 for the free movement of the bar 10 which is made of flexible metal. The bar is coiled at its lower end, and rounded to form a socket 11 for the ball 12 on the pivot pin 13. The ends of the pin 13 extend into the bearing 8 on each side of the slot 9 as shown in Fig. 3. This construction allows lateral movement of the catch to accommodate any misfit caused by a rapid assemblage of the parts of the automobile. The bar 10 extends through a slot in the bottom of the casing as shown in Fig. 2. The upper end of the bar is coiled to form a socket 14 for a transverse pin 15. Within the casing between the pin 15 and the bottom of the casing, is a coiled spring or its equivalent 16. The bar 10 is of sufficient length to allow its end 14 to project beyond the upper end of the casing. This permits the coiled spring 16 to be placed in position, after which the pin 15 is passed through the socket at the end of the bar. The hand-hold 17 is then attached to the casing in any desirable manner. The hook 7 forms an integral portion of the hand-hold in the present instance.

As shown in Fig. 2, the hand-hold has a plug 20 which extends into the upper end of the casing. The plug has an annular groove 21 as shown, into which is forced the metal of the casing. The end of the casing extends into a groove 22 in the hand-hold, making a very secure fastening. When the casing is made of struck-up sheet-metal, the hand-hold prevents the casing parting at the seams.

By the above construction, when it is desired to fasten the hood, the catch is raised, compressing the spring 16, and by a forward movement the hook 7 can be located in the socket 4 of the keeper on the hood. This movement brings the casing of the catch in contact with the rest 5 of the keeper, and the bar 10 is flexed to allow the casing to accommodate itself to the rest and the socket. Thus the catch is held in yielding contact with the keeper on the hood, preventing rattling of the parts, and, as stated above, if the hood is not in proper alignment, the catch will accommodate itself to the hood.

In Figs. 9 and 10 modifications of the keeper are shown. The extension $5^a$ is rigidly secured to the hood by a brace 18, and the ears 19 project from each edge of the extension. The extension 5, Fig. 8, may be rigid or may be made to yield under pressure of the hood as desired.

In Figs. 11 and 12, modifications are shown, in which a pocket 22 is provided for a cushion 24 of rubber or other material which will prevent rattling of the parts.

I claim:

1. The combination in a hood-catch, of a bearing; a casing having means to engage a keeper; a spring within the casing; and a flexible bar mounted in the bearing and extending into the casing and forming one bearing for the spring.

2. The combination in a hood-catch, of a casing; a bar extending into the lower end of the casing, said bar being flat and made of spring metal; a yielding means between the upper end of the bar and the casing; and a bearing for the lower end of the bar.

3. The combination in a hood-catch, of a bearing; a pivot pin therein having a ball, the pin extending on each side of the ball and forming trunnions; a bar having a socket for the ball; a casing into which the bar extends; a hook on the catch; and a keeper on the hood, said keeper having a broad rest for the casing when the hook is in engagement with the keeper.

4. The combination in a hood-catch, of a bearing; a pivot pin therein having a ball; a casing; a flexible flat bar having a socket at one end for the ball of the pivot pin and having a socket at the opposite end for a pin; a coiled spring between the pin and the bottom of the casing; and a hand-hold secured to the casing and having a hook to engage a keeper.

5. The combination of a keeper having a socket and an integral extension forming a rest; a casing of a catch; a bearing therefor; and a flexible bar mounted in the bearing and carrying the casing, said bar being flexed when the casing bears against the rest to allow the hook to engage the socket.

6. The combination in a hood-catch, of a sheet metal casing having longitudinal openings; and a hand-hold having a plug with an annular groove therein, said plug extending into one end of the casing, the hand-hold having an annular groove in line with the walls of the plug into which the end of the casing extends, the outer walls of the groove holding the casing against spreading, the metal of the casing extending into the annular groove of the plug.

ARTHUR C. JACKSON.